United States Patent [19]

Iwai et al.

[11] Patent Number: 4,920,933
[45] Date of Patent: May 1, 1990

[54] V-SHAPED TWO CYCLE ENGINE FOR OUTBOARD

[75] Inventors: Tomio Iwai; Masanori Takahashi, both of Hamamatsu, Japan

[73] Assignee: Sanshin Kogyo Kabushiki Kaisha, Hamamatsu, Japan

[21] Appl. No.: 183,653

[22] Filed: Apr. 19, 1988

[30] Foreign Application Priority Data

Apr. 21, 1987 [JP] Japan ................................ 62-97879

[51] Int. Cl.⁵ .............................................. F02M 1/16
[52] U.S. Cl. .................................. 123/73 A; 123/73 B
[58] Field of Search ................. 123/73 A, 73 B, 73 C, 123/73 V

[56] References Cited

U.S. PATENT DOCUMENTS 4,075,985  2/1978  Iwai ..................................... 123/73 A
4,235,206  11/1980  Boyesen ............................. 123/73 A
4,266,514  5/1981  Tyner ................................. 123/73 A
4,286,553  9/1981  Baltz et al. ......................... 123/73 A
4,462,346  7/1984  Haman et al. ..................... 123/73 A

FOREIGN PATENT DOCUMENTS 185609    8/1955  Fed. Rep. of Germany ... 123/73 A
0070207   6/1977  Japan ................................ 123/73 C
0074707   6/1977  Japan ................................ 123/73 A
52-124531 10/1977 Japan .
0706553  12/1979  U.S.S.R. ........................... 123/73 A Primary Examiner—David A. Okonsky
Attorney, Agent, or Firm—Ernest A. Beutler

[57] ABSTRACT

Two embodiments of V-type two cycle crankcase compression internal combustion engines wherein the charge supplied to the crankcase chambers by a primary induction system is supplemented by a secondary induction system that communicates with the crankcase chambers between the primary system and the respective cylinder bank.

6 Claims, 3 Drawing Sheets 4,920,933

V-SHAPED TWO CYCLE ENGINE FOR OUTBOARD

BACKGROUND OF THE INVENTION

This invention relates to a V-shaped, two cycle engine for an outboard and more particularly to an improved high efficiency and compact induction system for such an engine.

Because of their relative simplicity and compact configuration, two cycle engines are employed for a wide variety of purposes. One environment in which such engines find particular application is in outboard motors. Because of their compact nature, two cycle engines lend themself particularly to this application. In connection with outboard motors, it has recently been the practice to employ V-type engines in order to permit a larger displacement and greater output in a smaller area. However, because of the compact nature of a V-type engine it is difficult to provide adequate induction capability to the crankcase chambers of the engine so as to develop maximum power and realize the full potential of the displacement. The reason for this is that the fuel air charge must be delivered to the crankcase chambers for induction and compression before transfer to the combustion chambers. As a result, the positioning of the intake system and the provision of adequate capacity for it has presented some problems.

It is, therefore, a principal object of this invention to provide an improved induction system for a V-type two cycle crankcase compression internal combustion engine.

It is a further object of this invention to provide an improved induction system for a V-type crankcase compression internal combustion engine wherein separate passages supply the charge to the crankcase chambers and at least a portion of these passages is disposed outside of the valley of the V cylinder banks so as to promote better space utilization while, at the same time, offering a compact arrangement.

SUMMARY OF THE INVENTION

This invention is adapted to be embodied in a two cycle, crankcase compression internal combustion engine that comprise first and second cylinder banks that are disposed at an angle to each other and which define a valley therebetween. A crankcase chamber is positioned at the base of the valley of the engine and means are provided for admitting a charge to the crankcase chamber at a first location. In accordance with the invention, supplemental means are provided for admitting a supplemental charge to the crankcase chambers and this supplemental means is located outside of the valley of the cylinder banks and at a point spaced from the first means that admits the charge to the crankcase chambers.

DETAILED DESCRIPTION OF THE PREFERRED EMBODIMENTS OF THE INVENTION

Figure 1:
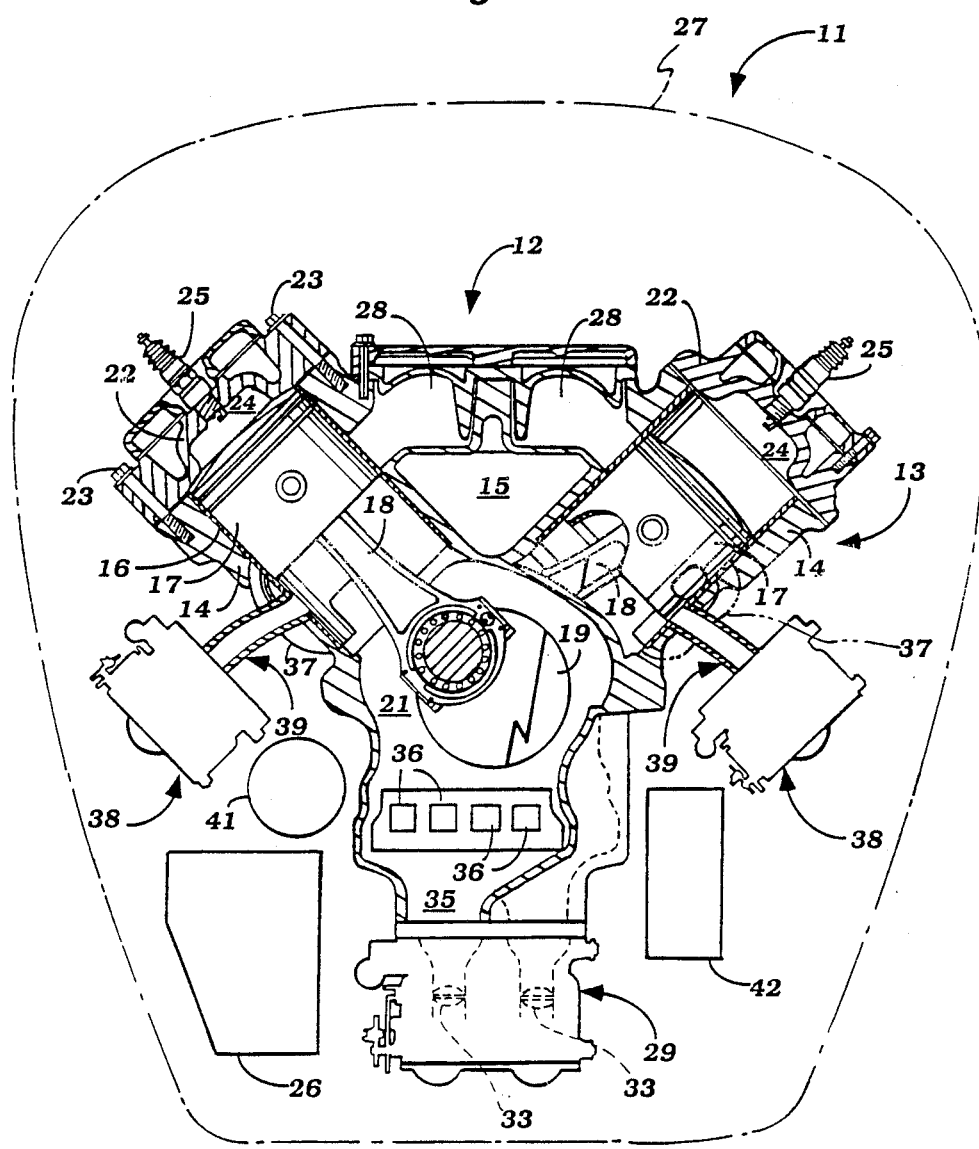
FIG. 1 is a cross-sectional view, taken along a horizontally extending plane, and shows the power head of an outboard motor constructed in accordance with a first embodiment of the invention.
Figure 2:
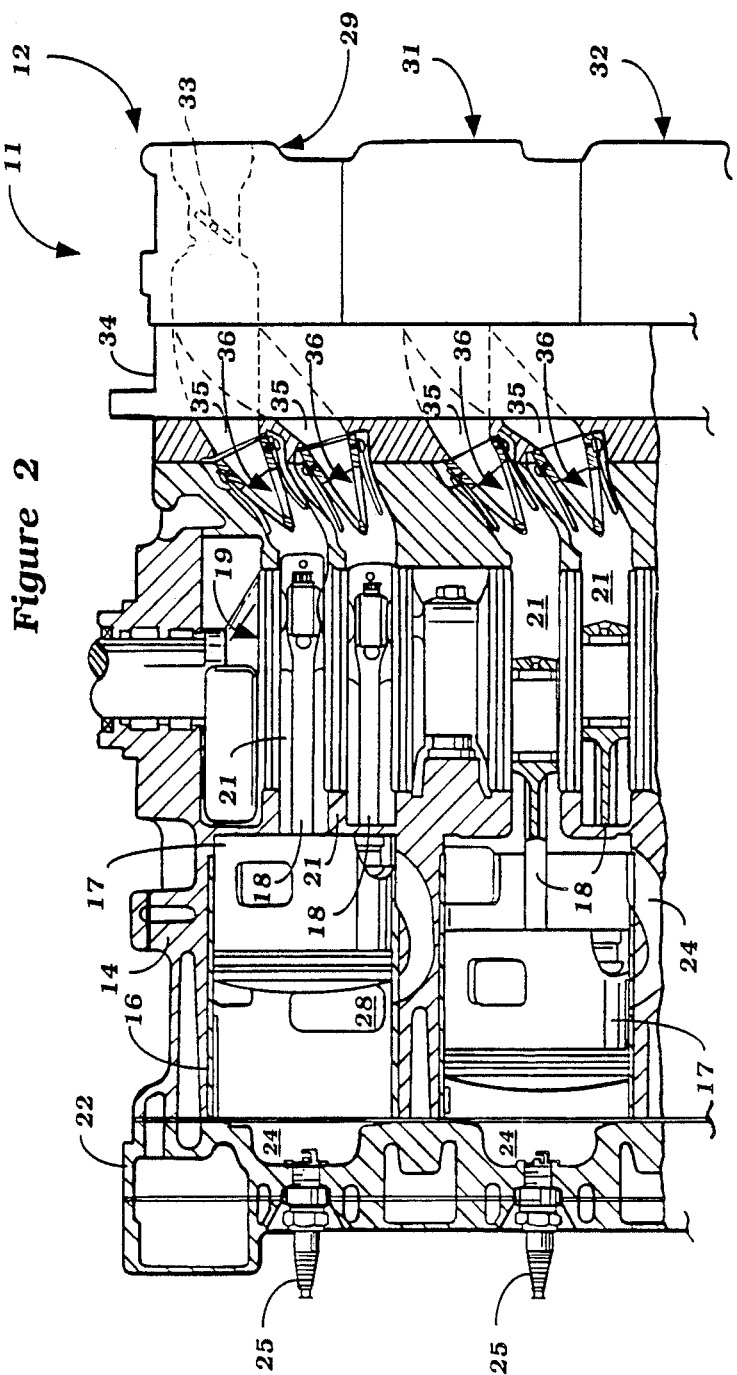
FIG. 2 is a side elevational view, with portions shown in cross-section, of the embodiment of FIG. 1.

Referring first to FIGS. 1 and 2, an outboard motor constructed in accordance with this embodiment is identified generally by the reference numeral 11. The invention is directed primarily toward the internal combustion engine of the outboard motor 11 and, for that reason, only the engine and its associated components have been illustrated in solid lines and will be described in detail. It is believed that those skilled in the art will readily know how the engine, which is identified generally by the reference numeral 12 is associated with the other components of the outboard motor 11.

The engine 12 is, in accordance with a principle of the invention, of the V type and is, in the illustrated embodiment, depicted as being a V-6, although not all 6 cylinder are shown in the drawings. To this end, the engine 12 is provided with a cylinder block assembly, indicated generally by the reference numeral 13 that is formed with a pair of cylinder banks 14. The cylinder banks 14 are disposed at an angle to each other and the degree or angle between the banks 14 will depend upon a variety of factors including the number of cylinders. The area between the cylinder banks 14 defines a valley 15.

Each cylinder bank 14 is provided with cylinder liners 16 in which pistons 17 are supported for reciprocation. The pistons 17 are connected by means of connecting rods 18 to a crankshaft 19 that rotates about a generally vertically disposed axis within a crankcase chamber 21. As is normal with two cycle engine practice, the crankcase chamber 21 is divided into a plurality of individual chambers, one for each of the pistons 17, which are sealed from each other in a suitable manner.

A respective cylinder head 22 is affixed to each of the cylinder banks 14 in a suitable manner, as by means of threaded fasteners 23. The cylinder heads 22 define cavities 24 which cooperate with the heads of the pistons 17 and the cylinder liner 16 to provide the combustion chambers of the engine.

Spark plugs 25 are carried by the cylinder heads 22 and have their spark gap disposed in the combustion chambers 24 for firing the charge therein. The spark plugs 25 are fired by means of a suitable ignition circuit, including a control box 26 which is positioned within an outer cowling 27 that encircles the engine 12. Since the outer cowling 27 forms no part of the invention it has been illustrated only in phantom.

The charge which has been burned in the combustion chambers 24 upon the firing of the spark plugs 25 and completion of the expansion thereof, are discharged through an exhaust manifold 28 and exhaust ports that are disposed in the valley 15 of the engine.

A fuel air charge is delivered to the sealed crankcase chambers 21 associated with each of the combustion chambers 24 by means of a primary induction system consisting of three vertically spaced, two barrel carburetors 29, 31 and 32. The carburetors 29, 31 and 32 have respective throttle valves 33 for controlling the flow through their individual barrels and discharge into an intake manifold 34 that is interposed between the carburetors 29, 31 and 32 and the crankcase chambers 21. The manifold 34 and associated engine have respective runners 35 that extend from each barrel of the carburetors 29, 31 and 32 to respective pairs of the crankcase chambers 21. Reed type check valves 36 are positioned at the discharge ends of the manifold runners 35 so as to prevent reverse flow therethrough.

The charge which is delivered to the crankcase chambers 21 is transferred to the combustion chambers 24 upon the decent of the pistons 17 through transfer or scavenge passages 37 that extend from the crankcase chambers to intake ports formed in the sides of the cylinder liners 16. This construction as thus far described may be considered to be conventional.

It should be noted that the compact configuration and the relatively limited effective cross-sectional area of the manifold passages 35 can reduce the breathing ability of the engine 12 and, accordingly, its maximum power output. In order to provide a still further fuel air charge to the crankcase chambers while still maintaining a compact construction, there is provided a supplementary induction system that is comprised of a supplementary carburetor or charge former 38 which is disposed adjacent each of the cylinder banks 14 for each of the cylinders 16. The carburetors 38 deliver a charge to the crankcase chambers 21 at a point spaced from the manifold runners 35 through supplementary intake passages 39 that intersect the cylinder liners 16 and communicate with the crankcase chambers 21 when the pistons 17 are at the upper portion of their stroke. If desired, the pistons 17 may also be provided with ported passages so that the manifold passages 39 communicate with the crankcase chambers 37 during the full stroke of the pistons 17.

It should be readily apparent from FIG. 1 that the layout of the primary intake system and supplementary intake system provides a very compact configuration. To further this end, an electric starter 41 may be positioned between the spark box 26 and one of the supplemental carburetors 38 for electric starting of the engine 12. In addition, the throttle linkage, indicated schematically at 42, may be positioned on the other side of the engine.

Figure 3:
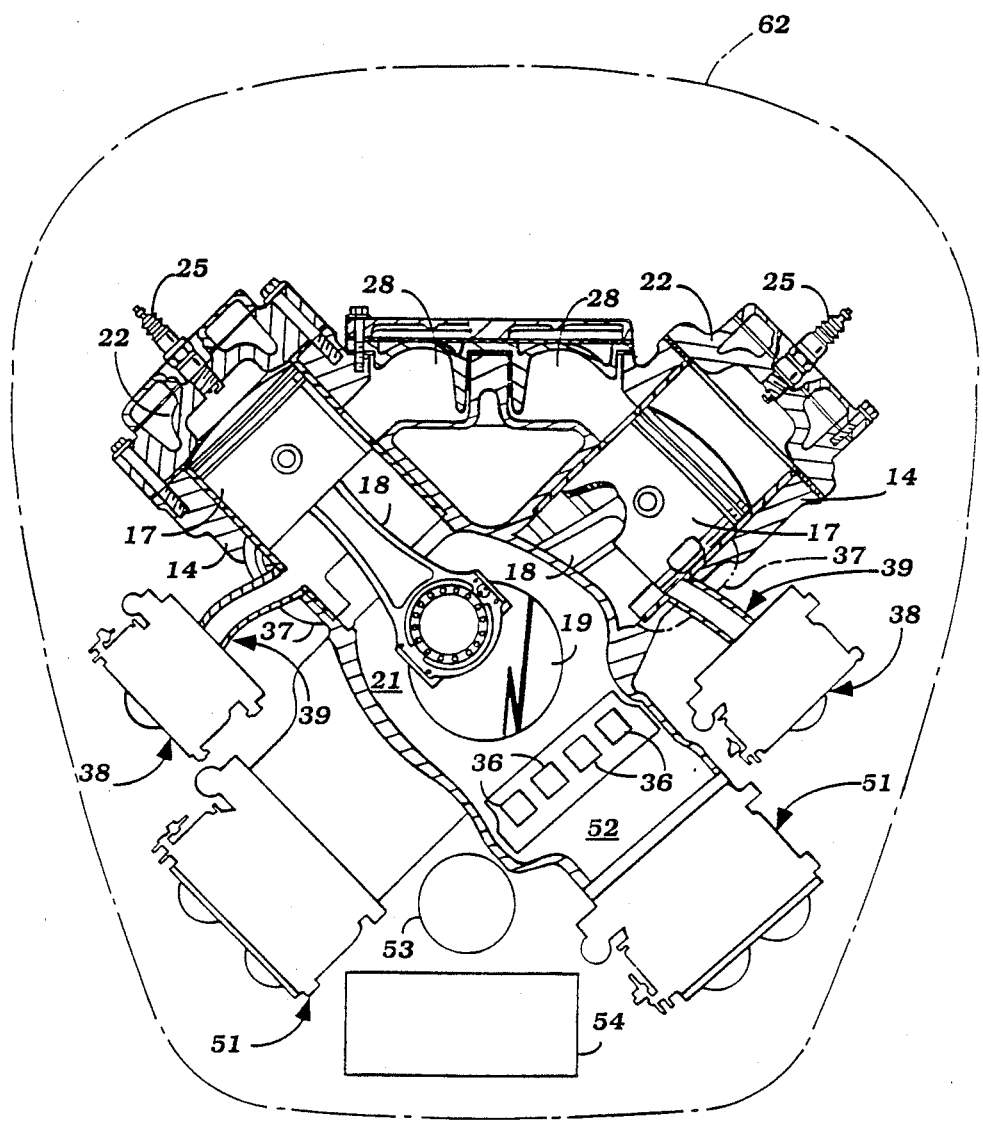
FIG. 3 is a cross-sectional view, in part similar to FIG. 1, showing another embodiment of the invention.

The embodiment of the invention shown in FIGS. 1 and 2 is of the type that employs three two barrel carburetors with each horizontally extending barrel serving a one of the pairs of cylinders of the adjacent cylinder banks. FIG. 3 shows another embodiment of the invention which is generally similar to the embodiment of FIGS. 1 and 2. However, this embodiment substitutes a slightly modified induction system that is comprised of a pair of three barrel carburetors 51 that serve the crankcase chambers 21 through respective manifold passageways 52. Each barrel of the carburetors 51 serves the cylinders of a respective cylinder bank so that one carburetor 51 serves one of the cylinder banks 14 while the other carburetor 51 serves the other cylinder bank 14. In all other regards, the basic construction of the engine of this embodiment is the same as the previously described embodiment and for that reason those components which are the same have been identified by the same reference numerals and will not be described again.

In this embodiment, since the carburetors 51 are disposed at an angle to each other a starter motor 53 is positioned in the valley between the carburetors 51 and their associated manifolds and a spark box 54 is positioned adjacent the starter motor 53 for firing the spark plugs 26. In all other regards, this embodiment is the same as the previously described embodiment.

It should be readily apparent from the foregoing description that the embodiments of the invention illustrated and described are effective in providing adequate breathing capability for an engine of the V type so that maximum power output can be achieved. Although two embodiments of the invention have been illustrated and described, various changes and modifications may be made without departing from the spirit and scope of the invention, as defined by the appended claims. For example, although the invention has been described in conjunction with primary and secondary carburetors, the invention may be equally as well practiced with engines having fuel injection or other forms of charge forming devices.

We claim:

1. In a two cycle, crankcase compression internal combustion engine comprising first and second cylinder banks disposed at an angle to each other and defining a valley therebetween, a crankcase chamber, and primary means for admitting a fuel air charge to said crankcase chamber at a first location, the improvement comprising secondary means for admitting a supplemental fuel air charge to said crankcase chamber, said secondary means being located in an area spaced from said primary means.

2. In a two cycle, crankcase compression internal combustion engine as set forth in claim 1 wherein the secondary means delivers a fuel air charge to the crankcase chambers at a point closer to the cylinder bank than the primary means.

3. In a two cycle, crankcase compression internal combustion engine as set forth in claim 1 wherein the primary means comprises a pair of horizontally disposed two barrel carburetors.

4. In a two cycle, crankcase compression internal combustion engine as set forth in claim 3 wherein the secondary means comprises a pair of separate carburetors.

5. In a two cycle, crankcase compression internal combustion engine as set forth in claim 1 wherein the primary means comprises a pair of primary carburetors.

6. In a two cycle, crankcase compression internal combustion engine as set forth in claim 5 wherein the secondary means comprises a pair of separate carburetors.

* * * * *